Sept. 23, 1958 R. G. MATTERS 2,853,160
MEANS FOR AND METHOD OF FABRICATION
Filed Feb. 16, 1956

Inventor
Robert G. Matters
by Richard R Mybeck
Attorney

United States Patent Office 2,853,160
Patented Sept. 23, 1958

2,853,160

MEANS FOR AND METHOD OF FABRICATION

Robert G. Matters, Milwaukee, Wis., assignor to Allis-Chalmers Manufacturing Company, Milwaukee, Wis.

Application February 16, 1956, Serial No. 565,943

7 Claims. (Cl. 189—36)

This invention relates generally to means for and a method of fabrication, and more particularly to means for and a method of joining two members into a unitary structure when, in operation, the members are movable relative to one another, such as when each of the members is composed of a material having a coefficient of thermal expansion different from that of the other and the fabricated article is exposed to heat. Materials characterized by diverse rates of thermal expansion have been chosen as generally illustrative of the relative motion embraced by the present invention. Such materials will be herein referred to as "dissimilar materials."

In the fabrication of structures comprising members of dissimilar materials joined into an assembly, the jointure or joint must satisfy two important requirements, both of which affect the ultimate useful life of the assembly: (1) the joint must be capable of withstanding the external forces it encounters during operation of the structure; (2) the joint must be capable of resisting the internal forces created during operation of the structure by the relative movement of the members.

Consider these requirements as they relate to the fabrication of a spindle for use in one type of gas turbine. A gas turbine spindle in operating position passes through what might be considered three regions. There is a "hot" region, a "cooler" region, and a "transition" region, i. e., that dawn-like region separating the "hot" from the "cooler" region. The spindle itself is a composite structure comprising a succession of spindle disks joined together.

Through the years industry learned that the disks operating in the hot region are subjected to severer conditions than those disks operating in the cooler region. Consequently, industry determined that while the disks for the hot region required a material having high strength at higher temperatures, such as austenitic steel, the disks for the cooler region could be of a material which, though possesses less strength at higher temperatures, is satisfactory at lower temperatures, such as ferritic steel.

Applying this knowledge, industry proposed a turbine spindle comprising a succession of disks of material such as austenitic steel on one end portion and a succession of disks of material such as ferritic steel on the other end portion, the two end portions being united together into one integral structure.

The build up of the two successions of disks of like material offered no real obstacle to the achievement of the proposed structure inasmuch as the art of joining like materials is well established.

The uniting of the two successions into one integral structure posed a knotty problem because the adjacent members were composed of dissimilar materials. This problem had to be solved if industry was to realize the cost reduction of substituting the cheaper ferritic type steels for the more expensive austenitic type steels used for the "cooler" region disks up to that time. This problem had to be solved if industry was to switch in part to a less critical source of supply for the "cool" portion of the spindle (austenitic type steels require critical alloys of cobalt and nickel which ferritic type steels do not).

The problem of joining members of dissimilar materials is not limited to the gas turbine industry but is equally applicable in any structure undergoing the application of heat. The gas turbine development merely served to highlight the problem and is herein described to provide a background for the present invention.

One prior art solution for the problem of joining adjacent turbine disks of dissimilar materials involved the formation of a conventional U-shaped groove in the abutment of the annular flanges defined on the respective disks, such as is shown in Fig. 1 of the accompanying drawing. Adjacent the bottom of the groove and external thereof, a backing ring was placed for containing the weld metal deposited in the groove by conventional means.

While this weld structure satisfied the aforementioned first requirement of the weld, to wit, the joint must be capable of withstanding the external forces it encounters during operation of the structure; it was quite unsatisfactory with respect to the aforementioned second requirement of the weld, to wit, the joint must be capable of resisting the interval forces created during its operation. Indeed, the relative movement of the members resulting from the differential in the expansion rates of the members induced considerable internal bending stresses and shear stresses in the weld which resulted in frequent fatigue failure at the joint of this prior art weld.

Thus, it was found that a new method of joining and a joint structure must be provided for uniting members of dissimilar materials which withstand the internal forced induced by the relative movement of the members to one another such as the variant thermal expansion responses of the members to cyclic heating and cooling while simultaneously withstanding the external forces it encounters during operation.

Therefore the present invention provides a weld structure for joining members which in operation are characterized by movement relative to each other, e. g., dissimilar materials, which weld structure improves upon the structures of the prior art by not only successfully withstanding the external forces it encounters in operation (which the prior art weld did do) but also withstanding the internal forces it encounters in operation (which the prior art weld did not do).

The present invention incorporates prior art means of withstanding external forces by utilizing a sufficient mass of weld material to provide such engineering properties as are needed to withstand the external forces encountered in the particular job. The sufficient mass can be determined by any number of conventional means, the most common probably being resort to a metals society handbook or other engineering handbook. However, the present invention further includes the novel disbursement of that mass into a plurality of spaced weld ligaments and therein lies an important feature of the present invention. The present invention further embraces methods for joining members which in operation are characterized by movement relative to one another to obtain the improved structure.

Accordingly, it is the primary object of the present invention to provide new means for and method of joining members which in operation are characterized by movement relative to one another which means and method overcome the heretofore mentioned disadvantages of the prior art.

A further primary object of the present invention is to provide an improved weld structure for joining two members which will withstand the internal bending and shearing stresses induced in it by the relative movement of the members to one another during operation.

Another object of the present invention is to provide a method for joining members which when so joined will meet engineering requirements for withstanding external forces applied thereto and at the same time withstand the internal bending and shear stresses induced therein by the movement of the members relative to one another during operation.

A still further object of the present invention is to provide an improved method of making a composite of members composed of dissimilar materials in which the various members are secured to each other in such a way that localized zones of weakness are largely, if not completely, eliminated and the overall resiliency of the structure is considerably improved.

Another object of the present invention is to provide an improved method of joining the constituent parts of such a builtup structure when such parts when joined in operation are characterized by movement relative to each other.

Another object of the present invention is to provide an improved weld structure for joining dissimilar materials characterized by a ligamentous cross section.

Another object of the present invention is to provide a weld structure for joining members of dissimilar materials which will meet engineering requirements for withstanding external forces applied thereto and at the same time withstand the internal bending and shear stresses induced therein by the different rates of thermal expansion exhibited by the members in response to applied heat.

A further object of the present invention is to provide an improved weld structure for joining two members characterized in their joined condition in operation by movement of one member relative to the other, said improved weld structure being characterized in that the mass of weld material required to resist external forces upon the joint is apportioned in a plurality of spaced weld ligaments.

A still further object of the present invention is to provide means for joining dissimilar materials into an assembly to be used in heat conditions which means diminishes the internal bending and shear stresses and increases the usefulness of the assembly.

A still further object of the present invention is to provide means for and a method of fabricating machine elements such as gas turbine spindles which may be effectively operated under varying temperature conditions without early fatigue failure.

These and further objects will appear from the following detailed description of the invention when read in conjunction with the accompanying drawings in which all numerals refer to like parts in the several views.

Figure 1:
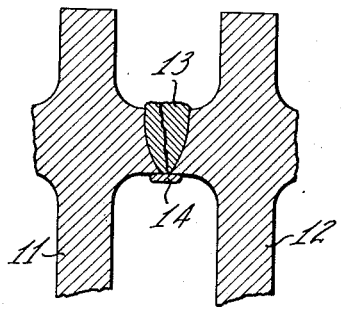
Fig. 1 is a cross sectional elevation of two turbine spindle disks of dissimilar material joined by a weld structure embodying the prior art.

In Fig. 1, two pieces of material exhibiting different coefficients of thermal expansion, such as turbine spindle 11 of a material having a relatively low coefficient of thermal expansion such as ferritic steel and turbine spindle 12 of a material having a relatively higher coefficient of thermal expansion such as austenitic material, are joined by conventional prior art weld 13 supported by a backing ring 14 to provide an integral part.

Figure 2:
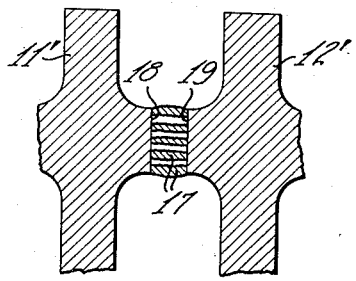
Fig. 2 is a cross sectional elevation of two turbine spindle disks of dissimilar material joined by a weld structure embodying the present invention.
Figure 7:
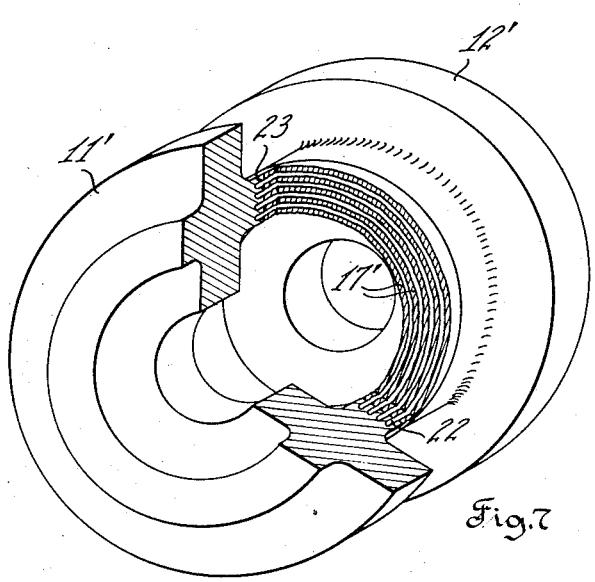
Fig. 7 is an oblique sectional view of a portion of a gas turbine spindle embodying the present invention.

In Fig. 2, two turbine spindle disks 11', 12', having a common or central axis of rotation and each exhibiting a coefficient of thermal expansion different from the other, are joined by ligamentous weld, i. e., a plurality of thin welded ligaments 17 which have been deposited in spaced relation to each other and between disks 11', 12' and in intimate fused relationship therewith. (The ligaments 17 may be so deposited in any suitable manner, such as by submerged arc welding, so long as all of them are disposed in spaced relation to each other between disks 11', 12'.) Ligaments 17 are preferred substantially parallel to each other. The ligaments 17, which occur as annular bands 17' in the turbine spindle chosen to illustrate the invention in Fig. 7, are successively deposited in the opening defined by the spindle disks and in spaced relation to each other. Each band is deposited and permitted to cool prior to the deposition of its adjacent band. As a practical matter, the band of ligament is usually cooled by the time the pass is complete so no time is lost waiting for a band to cool. Each subsequent band or ligament is deposited in the same manner as the earlier bands so that the final structure comprises a plurality of spaced concentric annular bands disposed in spaced relationship to each other and relative to the axis of rotation of the spindle. The ligaments 17 are particularly characterized by their thin elongated nature, the length of the ligaments, as herein used, referring to the length of the actual weld and the effective ligament length, as herein used, referring to the length of span between the main portions of the two dissimilar materials. The number of ligaments incorporated into a particular assembly must be such that the total quantity of weld material so deposited is at least equal to that amount of weld material sufficient to provide the joint with physical properties capable of withstanding the external forces it will encounter during operation.

The spacing between the successive bands may be achieved by the use of removable backing rings or by any other suitable means.

Figure 3:
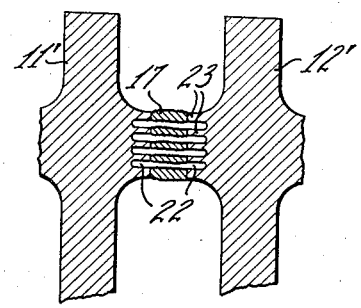
Fig. 3 is a cross sectional elevation of two turbine spindle disks of dissimilar material joined by a modified weld structure embodying the present invention.

Prior to the buildup of the ligaments 17 or annular bands 17', each of the disks 11', 12' is preferably provided with weldable surfaces 18, 19, respectively, which may be flat as shown in Fig. 2 or may be machined to provide a plurality of laterally extending horizontally spaced slots or grooves 22, as shown in Fig. 3, to provide a series of spaced blunt projections or lands 23 on each of the two disks 11', 12', to which ligaments 17 may be fused. When blunt projections or lands are employed, it is preferred that the lands 23 of one surface are substantially in opposed register to the corresponding lands on the other surface as shown in Fig. 3. Ligaments 17 are intimately fused to members 11', 12' on weldable surfaces 18, 19, irrespective of the contour of the surfaces.

Figure 4:
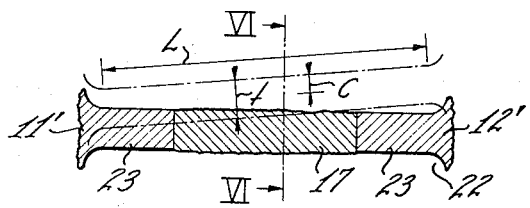
Fig. 4 is a schematic showing in section of a weld embracing the present invention before and during movement of the members relative to each other having certain dimensions indicated thereupon to assist the clarity of the derivations hereinafter presented.
Figure 5:
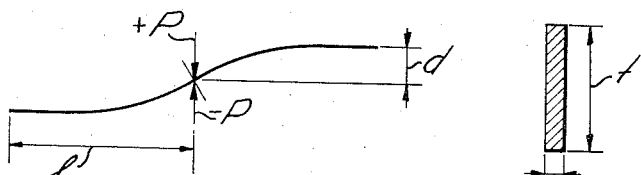
Fig. 5 is a showing of the bending stress of a weld of present invention at maximum deflection, certain physical relationships being indicated thereupon to assist the clarity of the derivations hereinafter presented.
Figure 6:
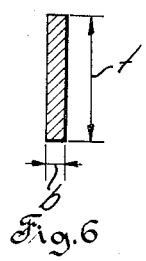
Fig. 6 is a section taken along line VI—VI of Fig. 4 indicating dimensional symbols of that area.

The theory underlying the success of the weld structure of the present invention has not been rigorously developed. However, a help in understanding the concept may be harvested by drawing an analogy to the art of structural beams. None of the basic beams, viz., simple, fixed or cantilever precisely conforms to the ligament span of the invention because of the relatively movable nature of the regions in which the ligament and the members are fused, as shown in Fig. 4. However, considering each ligament to comprise two cantilever beams, each having its load concentrated at its free end (the two loads being equal in magnitude and opposite in direction), appears to offer some help in understanding the relationship of the thickness and length of ligament with respect to its internal bending and shear stresses. The relationship of the physical dimensions of the ligaments are shown in Figs. 4, 5 and 6 with the specific dimensions so shown being defined in the following derivations.

Considering the load to be the force resulting from the relative movement of the one member with respect to the other member (such as results from the different expansion rates of two members of equal mass but of dissimilar materials) at the period of maximum deflection and analyzing one of the two theorized cantilevers; the following relationships appear (source of basic relationships being the "Handbook of Engineering Fundamentals," edited by D. W. Eshbach, Wiley & Sons, N. Y., 1936):

(1) $$d = \frac{Pl^3}{3EI}$$

where: $d$ is the maximum deflection of the beam (the "beam" as indicated above being equal to one half the effective length of the ligament L, as indicated in Fig. 4) in inches; P is the concentrated load in pounds; $l$ is the length of the beam in inches; E is the modulus of elasticity in pounds per square inch; and I is the moment of inertia of the cross section with respect to its neutral axis in inches $^4$.

(2) $$S = \frac{Mc}{I}$$

where: S is the elastic bending stress (tensile or compressive), i. e., unit stress on any fiber in pounds per square inch; M is the bending moment in pounds-inches; $c$ is the distance of the fiber (chosen cross section) from the neutral surface inches; and I is again the moment of inertia of the cross section with respect to its neutral axis in inches $^4$.

But, disregarding sign, the following relationship is known with respect to the cantilever beam, viz:

(3) $$M = Pl$$

Substituting this value of M in Equation 2, the following equation evolves:

(4) $$S = \frac{Plc}{I}$$

Transposing Equation 1 to obtain a value for P, the following equation evolves:

(5) $$P = \frac{3EId}{l^3}$$

Substituting this value of P in Equation 4, the following equation is evolved:

(6) $$S = \frac{3EIdlc}{l^3 I} = \frac{3Edc}{l^2}$$

But $c$ lies along the thickness $t$ of the cross section and consequently the following is true:

(7) $$c = k(t)$$

where $k$ is the constant ratio of a given $c$ to a given thickness $t$. Substituting in Equation 6 the value for $c$ obtained in Equation 7, the following equation evolves:

(8) $$S = \frac{3Edk(t)}{l^2}$$

But 3, E, $d$ and $k$ are all constants which may be combined into a single constant, K. Consequently (9) $$S = K(t/l^2)$$

or to put it another way:

(10) $$S = f(t/l^2)$$

Therefore, the internal elastic bending stress of a given cross section of the beam is directly proportional to the thickness of the beam and inversely proportional to the square of the length of the beam. Thus, applicant in decreasing the thickness and increasing the length of the weld by ligaments, reduced the internal elastic bending stress in the ligament thereby reducing the possibility of fatigue failure resulting in the ligament because of internal bending stress.

In the beginning, only one of the two hypothetical beams of the ligament were considered. It is obvious, however, that the above relationships are equally applicable to the second beam, since P is equal to that of the first, being merely opposed in sign.

It is understood that the reduction in thickness and increase in length of the ligament does not effect the mass of weld needed to withstand external forces. Rather, as hereinbefore described, the present invention prescribes a novel disbursement of that mass whereby external force resistance is maintained and internal force resistance greatly enhanced.

Consider now, the relationship of applicant's improved structure to the internal shear stress, $S_s$, induced in the ligament by the maximum deflection. Consider a minute radial cross section normal to the longitudinal axis of the beam and having a breadth, $b$, and a thickness, $t$ (see Fig. 6), it is well known that:

(11) $$S_s = P/bt$$

But in Equation 5, a value was determined for P. Substituting that value in Equation 1, the following equation evolves:

(12) $$S_s = \frac{2EId}{l^3 bt}$$

But the moment of inertia, I, for a rectangular section is:

(13) $$I = bt^2/6$$

Substituting this value of I into Equation 12, the following equation evolves:

(14) $$S_s = \frac{Etd}{2l^3} = \frac{2Ebt^2 d}{6l^3 bt} = \frac{Etd}{2l^3}$$

Again, since E, $d$ and 2 are constants, they can be combined into a single constant, K', and the following equation evolves:

(15) $$S_s = K'(t/l^3)$$

or to put it another way:

(16) $$S_s = f(t/l^3)$$

Therefore, the internal shear stress of a given cross section of the beam is directly proportional to the thickness of the beam and inversely proportional to the cube of the length of the beam. Thus, applicant in decreasing the thickness and increasing the length of the weld ligaments, reduces the internal shear stress in the ligament thereby reducing the possibility of fatigue failure resulting in the ligament because of internal shear stress.

It is obvious to one skilled in the art that changes may be made in the form of construction and arrangement of the several parts as shown and of the method as indicated within the scope of the appended claims without departing from the spirit of the invention and I do not therefore wish to limit myself to the exact construction and arrangement shown but only insofar as I am limited by the appended claims.

It is claimed and desired to secure by Letters Patent:

1. A method for structurally uniting two members composed of weldable materials, each of said materials being characterized by a coefficient of thermal expansion different from that of the other of said materials, comprising the steps of: providing each of said members with a weldable surface; defining a plurality of substantially parallel spaced grooves in each of said surfaces to provide a plurality of substantially parallel spaced lands therebetween; presenting said weldable surfaces in opposed spaced relationship to each other so that the grooves and lands of one surface respectively oppose the grooves and lands of the other surface; depositing a plurality of thin weld ligaments, each between the land on one surface and the correspondingly opposed land on the other surface in such a manner that each of said ligaments becomes intimately fused with its corresponding lands.

2. A method of joining two rotary members into an article of manufacture which in operation requires said members to be movable relative to one another and to be rotated about a common axis, said members being acted upon by predetermined external forces when rotated, said method comprising: depositing a plurality of radially spaced annular weld ligaments extending axially between said members and coaxially about said common axis and fusing the ends of said weld ligaments intimately with said members, said plurality of ligaments being sufficient to withstand said predetermined external forces.

3. A rotary weld structure comprising: a first rotary member composed of weldable material and symmetrically constructed for rotation about a central axis; a second rotary member composed of weldable material having a coefficient of thermal expansion relatively higher than the coefficient of thermal expansion of said first member and having a construction symmetrically disposed for rotation about said central axis, said second member being disposed in spaced axial alignment with said first member for rotation about said central axis; and a series of radially spaced annular ligamentous welds connecting the first and second members, said welds being concentric with said central axis.

4. A rotary weld structure comprising: a first rotary member composed of material having a given coefficient of thermal expansion and symmetrically constructed for rotation about a common axis, said member having an annular weld surface projecting therefrom and concentric with said common axis; a second member composed of material having a coefficient of thermal expansion relatively higher than the given coefficient of thermal expansion of said first member and symmetrically constructed for rotation about said common axis, said second member having an annular weld surface projecting therefrom and concentric with said common axis and having said weld surface disposed in axially spaced and confronting relationship to said weld surface of said first member, said two weld surfaces defining the lateral boundaries of a welding groove; and a series of radially spaced annular ligamentous welds disposed in said groove and connecting said weld surfaces.

5. A rotary weld structure comprising: a first rotary member composed of weldable material having a given coefficient of thermal expansion and constructed symmetrically for rotation about a common axis, said member having a weld surface projecting therefrom defining a plurality of juxtapositioned annular lands and grooves concentric with said common axis; a second member composed of weldable material having a coefficient of thermal expansion relatively higher than the given coefficient of thermal expansion of said first member and constructed symmetrically for rotation about said common axis, said second member having a weld surface projecting therefrom defining a plurality of juxtapositioned annular lands and grooves concentric with said common axis of rotation and disposed in a confronting relationship to said lands and grooves on said weld surface of said first member; and a plurality of radially spaced annular weld ligaments, one of said ligaments being interposed between and intimately fused with each of said confronting opposed lands on said weld surfaces.

6. A rotary weld structure comprising: a first disklike member composed of weldable material and symmetrically constructed for rotation about a central axis; a second disklike member composed of weldable material having a coefficient of thermal expansion relatively higher than the coefficient of thermal expansion of said material of said first member and having a symmetrically disposed construction for rotation about said central axis; said second member being axially spaced from said first member and aligned with said first member for rotation about said central axis and a plurality of radially spaced annular bands concentric with said central axis and intimately fused and connecting with said first and second members.

7. A method for fabricating a rotor by joining two or more rotary members when each of the members is composed of material having a coefficient of thermal expansion which differs from that of the others and all of said members are symmetrically constructed for rotation about a common axis, said method comprising the steps of: providing an annular welding surface on each of the adjoining sides of said rotary members of a predetermined diameter concentric about said common axis; aligning said members with reference to said common axis and in axially spaced relationship with each other; and to present said welding surfaces on each of said members in a confronting relationship with each other; depositing a first annular weld ligament between said surfaces and in intimate fused contact therewith; depositing a second annular weld ligament between said surfaces and in intimate fused contact therewith radially spaced from said first ligament; and repeating the steps of depositing individual radially spaced annular weld ligaments until a predetermined number of ligaments have been deposited.

References Cited in the file of this patent

UNITED STATES PATENTS

| | | |
|---|---|---|
| 1,268,980 | Krumholz | June 11, 1918 |
| 1,485,645 | Tindale | Mar. 4, 1924 |
| 1,767,220 | Malm | June 24, 1930 |
| 2,179,774 | Zerbe | Nov. 14, 1939 |
| 2,637,521 | Constantine et al. | May 5, 1953 |

FOREIGN PATENTS

| | | |
|---|---|---|
| 909,414 | France | May 8, 1946 |